US008700293B2

(12) United States Patent
Okude et al.

(10) Patent No.: US 8,700,293 B2
(45) Date of Patent: Apr. 15, 2014

(54) TRAFFIC INFORMATION DISTRIBUTION METHOD, TRAFFIC INFORMATION DISTRIBUTION APPARATUS AND IN-VEHICLE TERMINAL

(75) Inventors: Mariko Okude, Ibaraki (JP); Kenichiro Yamane, Ibaraki (JP); Masatoshi Kumagai, Ibaraki (JP); Junsuke Fujiwara, Ibaraki (JP); Hirotaka Takahashi, Ibaraki (JP)

(73) Assignee: Xanavi Informatics Corporation, Zama-shi (JP)

( * ) Notice: Subject to any disclaimer, the term of this patent is extended or adjusted under 35 U.S.C. 154(b) by 1315 days.

(21) Appl. No.: 12/020,188

(22) Filed: Jan. 25, 2008

(65) Prior Publication Data

US 2008/0183375 A1 Jul. 31, 2008

(30) Foreign Application Priority Data

Jan. 26, 2007 (JP) ................................ 2007-016044

(51) Int. Cl.
*G01C 21/00* (2006.01)

(52) U.S. Cl.
USPC ........... 701/117; 701/118; 701/119; 701/414; 701/421; 701/423; 340/995.1; 340/995.12; 340/995.13

(58) Field of Classification Search
USPC .......... 701/117–119, 200–213; 340/933–943, 340/988–996; 342/454–456; 382/104
See application file for complete search history.

(56) References Cited

U.S. PATENT DOCUMENTS

| | | | | |
|---|---|---|---|---|
| 6,317,686 | B1 * | 11/2001 | Ran | 701/533 |
| 6,480,783 | B1 * | 11/2002 | Myr | 701/117 |
| 6,745,123 | B1 * | 6/2004 | Petzold et al. | 701/451 |
| 6,882,930 | B2 * | 4/2005 | Trayford et al. | 701/117 |
| 7,203,598 | B1 * | 4/2007 | Whitsell | 701/521 |
| 7,580,791 | B2 * | 8/2009 | Froeberg | 701/420 |
| 7,729,335 | B2 * | 6/2010 | Lee et al. | 370/349 |

(Continued)

FOREIGN PATENT DOCUMENTS

| | | | |
|---|---|---|---|
| JP | 2005-17151 | A | 1/2005 |
| JP | 2005-292024 | A | 10/2005 |
| JP | 2006-84257 | A | 3/2006 |

OTHER PUBLICATIONS

Chinese Office Action dated Jun. 19, 2009, with English translation (ten (10) pages).

(Continued)

*Primary Examiner* — Jonathan M Dager
(74) *Attorney, Agent, or Firm* — Crowell & Moring LLP

(57) ABSTRACT

Disclosed is a traffic information distribution apparatus 1 including date-time information in traffic information acquired by the traffic information acquire unit 12 or generated by the traffic information prediction unit, and accumulates the traffic information in the traffic information DB 13. When the traffic information distribution apparatus 1 receives distribution request information transmitted from the in-vehicle terminal 5, based on date-time information of reference traffic information held by the in-vehicle terminal 5 included in the distribution request information, the traffic information distribution apparatus 1 retrieves traffic information including the same date-time information as the date-time information of the reference traffic information from the traffic information DB 13. Then, difference traffic information generation unit 18 generates difference traffic information between the retrieved traffic information and traffic information to be distributed, and the traffic information distribution apparatus 1 distributes the generated difference traffic information to the in-vehicle terminal 5.

8 Claims, 9 Drawing Sheets

(56) References Cited

U.S. PATENT DOCUMENTS

| | | | | |
|---|---|---|---|---|
| 7,755,509 | B2 * | 7/2010 | Bespalov et al. | 340/905 |
| 7,783,416 | B2 * | 8/2010 | Sugawara et al. | 701/117 |
| 7,940,742 | B2 * | 5/2011 | Lee et al. | 370/349 |
| 8,009,659 | B2 * | 8/2011 | Kim et al. | 370/349 |
| 2004/0143385 | A1 * | 7/2004 | Smyth et al. | 701/117 |
| 2004/0267440 | A1 * | 12/2004 | DeKock et al. | 701/117 |
| 2005/0010360 | A1 * | 1/2005 | Nagase et al. | 701/210 |
| 2005/0043880 | A1 * | 2/2005 | Yamane et al. | 701/200 |
| 2005/0090974 | A1 * | 4/2005 | Hirose | 701/208 |
| 2005/0131631 | A1 * | 6/2005 | Nakano et al. | 701/200 |
| 2005/0140525 | A1 * | 6/2005 | Tomita et al. | 340/995.13 |
| 2005/0143903 | A1 * | 6/2005 | Park et al. | 701/117 |
| 2005/0143906 | A1 * | 6/2005 | Ishikawa et al. | 701/200 |
| 2005/0192737 | A1 * | 9/2005 | Zhao et al. | 701/117 |
| 2005/0206534 | A1 * | 9/2005 | Yamane et al. | 340/994 |
| 2005/0209772 | A1 * | 9/2005 | Yoshikawa et al. | 701/200 |
| 2005/0240340 | A1 * | 10/2005 | Ishikawa et al. | 701/117 |
| 2005/0256639 | A1 * | 11/2005 | Aleksic et al. | 701/210 |
| 2006/0004511 | A1 * | 1/2006 | Yoshikawa et al. | 701/200 |
| 2006/0025925 | A1 * | 2/2006 | Fushiki et al. | 701/210 |
| 2006/0058940 | A1 * | 3/2006 | Kumagai et al. | 701/117 |
| 2006/0074546 | A1 * | 4/2006 | DeKock et al. | 701/117 |
| 2006/0074551 | A1 * | 4/2006 | Zaitsu et al. | 701/209 |
| 2006/0167616 | A1 * | 7/2006 | Yamane et al. | 701/117 |
| 2006/0178807 | A1 * | 8/2006 | Kato et al. | 701/117 |
| 2007/0005230 | A1 * | 1/2007 | Sera | 701/117 |
| 2007/0118275 | A1 * | 5/2007 | Qi et al. | 701/117 |
| 2007/0118281 | A1 * | 5/2007 | Adam et al. | 701/211 |
| 2007/0155404 | A1 * | 7/2007 | Yamane et al. | 455/456.1 |
| 2007/0208497 | A1 * | 9/2007 | Downs et al. | 701/117 |
| 2007/0208498 | A1 * | 9/2007 | Barker et al. | 701/117 |
| 2008/0033630 | A1 * | 2/2008 | Lee et al. | 701/117 |

OTHER PUBLICATIONS

Japanese Office Action dated Feb. 22, 2011 (Three (3) pages).

* cited by examiner

FIG.3

| LINK ID | LINK TRAVEL-TIME | | |
|---|---|---|---|
| | TRAFFIC INFORMATION 1 | TRAFFIC INFORMATION 2 | TRAFFIC INFORMATION 3 |
| | DATE-TIME INFORMATION T1 | DATE-TIME INFORMATION T2 | DATE-TIME INFORMATION T3 |
| 1 | NOT KNOWN | NOT KNOWN | NOT KNOWN |
| 2 | 10 | 10 | 20 |
| 3 | 20 | 25 | 30 |
| 4 | 50 | 50 | 60 |
| 5 | 40 | 40 | 40 |

131

LINKS WHOSE TRAFFIC INFORMATION IS DIFFERENT FROM TRAFFIC INFORMATION 1

| LINK ID | TRAVEL-TIME |
|---|---|
| 3 | 25 |

132

| LINK ID | TRAVEL-TIME |
|---|---|
| 2 | 20 |
| 3 | 30 |
| 4 | 60 |

133

TRAFFIC INFORMATION DISTRIBUTION METHOD, TRAFFIC INFORMATION DISTRIBUTION APPARATUS AND IN-VEHICLE TERMINAL

CROSS REFERENCE TO RELATED APPLICATIONS

This application claims the foreign priority benefit under 35 U.S.C. §119 of Japanese Patent Application No. 2007-016044 filed on Jan. 26, 2007, the disclosure of which is incorporated herein by reference.

BACKGROUND OF THE INVENTION

1. Field of the Invention

The present invention relates to a traffic information distribution method and a traffic information distribution apparatus for distributing traffic information regarding a traffic situation to a car navigation system and an in-vehicle terminal for receiving the distributed traffic information and displaying the distributed traffic information on a display apparatus.

2. Description of the Related Art

Conventionally, there is VICS (Vehicle Information and Communication System) (registered trademark) managed by Vehicle Information and Communication System Center (hereinafter referred to as VICS (registered trademark) Center) in Japan as a system for distributing traffic information regarding a traffic situation to a vehicle. In VICS (registered trademark), the traffic information such as traffic jam information on a road and travel-time of a route is calculated based on real-time traffic information collected by on-road sensors (e.g. an ultrasonic sensor, a loop coil sensor, an optical beacon, and an imaging device and the like) managed by prefectural police and a road administrator, and the calculated traffic information is distributed to an in-vehicle terminal equipped with a vehicle via a narrow band communication means such as an optical or radio beacon or a wide band communication means such as FM multiple broadcasting.

In recent years, because it becomes common to equip a vehicle with a car navigation system, a VICS (registered trademark) terminal is rarely used alone and the car navigation system often doubles as the VICS terminal. To the car navigation system, not only the traffic information provided by VICS (registered trademark) but also the traffic information of which added value is increased by processing the traffic information provided by VICS (registered trademark) (e.g. predicted traffic information and the like) are distributed via the Internet and a communication network of mobile phones in response to a request from each driver.

In VICS (registered trademark), a link which can provide the traffic information is limited to a link where an on-road sensor is installed, and thus limited to a predetermined link (the link is referred to as "a VICS (registered trademark) link" hereinafter). The number of the VICS (registered trademark) links has been increasing year by year due to road improvement and installation of on-road sensors, and it also becomes possible to collect and provide traffic information obtained from a link different from the VICS (registered trademark) link due to development of the probe technology of a traffic situation. Thus, it is expected that the amount of the traffic information distributed to the car navigation system from a traffic information distribution center will keep increasing. Therefore, it is desired to reduce the amount of the traffic information distributed to the car navigation system from the traffic information distribution center.

Japanese Laid-open Patent Application No. 2006-84257 discloses a technique which employs difference distribution to reduce the amount of the traffic information which is distributed to the car navigation system from the traffic information distribution center. When the traffic information is distributed in the difference distribution, only a part of the traffic information different from the traffic information distributed before (difference information) is distributed. With this difference distribution, because only the difference information is distributed, it is possible to reduce the amount of the traffic information distributed compared to a case where entire information of the traffic information is always distributed.

When the difference information is distributed many times and a car navigation system to receive the difference information at some point in time, generally the terminal can neither reproduce information based on the difference information which has been failed to be received nor reproduce information based on the subsequent difference information even if the terminal succeeds to receive the subsequent difference information. To allow the terminal to reproduce the traffic information correctly in the above case, the traffic information distribution center needs to store and manage a version or date-time information of the traffic information the car navigation system holds.

When the difference information is distributed form the traffic information distribution center to the car navigation system, because a communication between the traffic information distribution center and the car navigation system is carried out via radio waves, it is likely for the car navigation system to fail to receive the distributed traffic information when a vehicle is in a place where reception of the radio waves is not good, such as in a tunnel.

Conventional techniques including the technique disclosed in the Japanese Laid-open Patent Application No. 2006-84257, however, manages neither a version of information which is a basis of difference information nor a version of the traffic information held by the car navigation system. With the conventional techniques, it is expected that when distribution of the traffic information from the traffic information center to the car navigation system fails, the car navigation system cannot reproduce the traffic information in a high ratio.

In view of the above problems, an object of the present invention is to provide a traffic information distribution method, a traffic information distribution apparatus and an in-vehicle terminal which can reduce the amount of the information distributed and improve reliability of information distribution in distribution of the traffic information to the in-vehicle terminal such as the car navigation system.

A first aspect of the preset invention provides a traffic information distribution method implemented in a computer which acquires or generates traffic information on a road traffic situation and distributes the traffic information individually to each of in-vehicle terminals equipped with vehicles, the method allowing the computer to perform the steps including: a traffic information accumulation step of, at the time when the computer acquires or generates the traffic information, including predetermined identification information in the traffic information and accumulating in a storage device the traffic information which includes the predetermined identification information; a distribution request information reception step of receiving distribution request information transmitted from the in-vehicle terminal and containing identification information which is included in reference traffic information the in-vehicle terminal holds at the time when the in-vehicle terminal transmits the distribution request information; a difference traffic information generation step of generating difference traffic information between the traffic information stored in the storage device and having a same identification information as the identification information included in the reference traffic information contained in the received distribution request information and the traffic information which is to be distributed at the time when the difference traffic information is generated; and a traffic information distribution step of distributing the generated difference traffic information to the in-vehicle terminal.

A second aspect of the present invention provides a traffic information distribution method implemented in a computer which distributes predicted traffic information regarding a road traffic situation individually to each of in-vehicle terminals equipped with vehicles, the computer including a predicted traffic information accumulation unit for accumulating at least a group of a plurality of pieces of the predicted traffic information, each piece of which pertains to a different time that belongs to a same time-line, the method allowing the computer to perform the steps including: a distribution request information reception step of receiving from the in-vehicle terminal distribution request information which requests the computer to distribute the predicted traffic information; a reference information selection step of selecting one of the plurality of pieces of the predicted traffic information, each piece of which pertains to a different time that belongs to the same time-line, as a reference traffic information, when the received distribution request information contains a distribution request of the plurality of pieces of the predicted traffic information, each piece of which pertains to a different time that belongs to a same time-line; a difference traffic information generation step of generating difference traffic information between the predicted traffic information which is not selected as the reference traffic information and the reference traffic information; a traffic information distribution step of distributing entire information of the predicted traffic information selected as the reference traffic information and the difference traffic information between the reference traffic information and the predicted traffic information not selected as the reference traffic information to the in-vehicle terminal.

A third aspect of the present invention provides a traffic information distribution method implemented in a computer which distributes real-time traffic information on a road traffic situation at once to in-vehicle terminals equipped with vehicles, the method allowing the computer to perform the steps including: a real-time traffic information acquiring step of acquiring the real-time traffic information at a predetermined interval; a reference traffic information selection step of selecting the real-time traffic information acquired at the predetermined interval at the real-time traffic information acquiring step as a reference traffic information once in a predetermined times the real-time traffic information is acquired; a difference information generation step of generating difference traffic information between the real-time traffic information which is not selected as the reference traffic information among the real-time traffic information which has been acquired at the real-time traffic information acquiring step and latest reference traffic information; a traffic information distribution step of distributing entire information of the real-time traffic information selected as the reference traffic information and the difference traffic information between the reference traffic information and the real-time traffic information which is not selected as the reference traffic information to the in-vehicle terminals.

A fourth aspect of the present invention provides a traffic information distribution method implemented in a computer which distributes predicted traffic information regarding a road traffic situation at once to in-vehicle terminals equipped with vehicles, the computer including a predicted traffic information accumulation unit for accumulating at least a group of a plurality of pieces of the predicted traffic information, each piece of which pertains to a different time that belongs to a same time-line, the method allowing the computer to perform the steps including: a reference traffic information selection step of selecting a piece of the plurality of pieces of the predicted traffic information having the different times as reference traffic information; a difference traffic information generation step of generating difference traffic between the predicted traffic information which is not selected as the reference traffic information and the reference traffic information; a traffic information distribution step of distributing entire information of the predicted traffic information which is selected as the reference traffic information and the difference traffic information of the predicted traffic information which is not selected as the reference traffic information to the in-vehicle terminals.

A fifth aspect of the present invention provides a traffic information distribution apparatus which acquires or generates traffic information on a road traffic situation and distributes the traffic information individually to each of in-vehicle terminals equipped with vehicles, the apparatus including: a traffic information accumulation unit for including a predetermined identification information in the traffic information and accumulating in a storage device the traffic information which includes the identification information when the traffic information distribution apparatus acquires or generates the traffic information; a distribution request information reception unit for receiving distribution request information transmitted from the in-vehicle terminal and contains identification information included in reference traffic information the in-vehicle terminal holds at the time when the in-vehicle terminal transmits the distribution request information; a difference traffic information generation unit for generating difference traffic information between the traffic information stored in the storage device and including a same identification information as the identification information included in the reference traffic information contained in the received distribution request information and the traffic information which is to be distributed at the time when the difference traffic information is generated; and a traffic information distribution unit for distributing the generated difference traffic information to the in-vehicle terminal.

A sixth aspect of the present invention provides a traffic information distribution apparatus which distributes predicted traffic information regarding a road traffic situation individually to each of in-vehicle terminals equipped with vehicles, including: a predicted traffic information accumulation unit for accumulating at least a group of a plurality of pieces of the predicted traffic information each of which pertains to a different time that belongs to a same time-line; a distribution request information reception unit for receiving from the in-vehicle terminal distribution request information which requests the traffic information distribution apparatus to distribute the predicted traffic information; a reference traffic information selection unit for selecting as reference traffic information one of the plurality of pieces of the predicted traffic information each of which pertains to a different time that belongs to the same time-line when the received distribution request information contains a distribution request of the plurality of pieces of the predicted traffic information each of which pertains to a different time that belongs to the same time-line; a difference traffic information generation unit for generating difference traffic information between the reference traffic information and the predicted traffic information which is not selected as the reference traffic information; a traffic information distribution unit for distributing entire information of the predicted traffic information selected as the reference traffic information and the difference traffic information of the predicted traffic information which is not selected as the reference traffic information.

A seventh aspect of the present invention provides a traffic information distribution apparatus which distributes real-time traffic information on a road traffic situation at once to in-vehicle terminals equipped with vehicles, including: a real-time traffic information acquiring unit for acquiring the real-time traffic information at a predetermined interval; a reference traffic information selection unit for selecting as reference traffic information a piece of the real-time traffic information acquired by the real-time traffic information acquiring unit at the predetermined interval once in a predetermined times the real-time traffic information is acquired; a difference traffic information generation unit for generating difference traffic information between latest reference traffic information and the real-time traffic information which is not selected as the reference traffic information among the acquired real-time traffic information; a traffic information distribution unit for distributing entire information of the real-time traffic information selected as the reference traffic information to the in-vehicle terminals, and distributing the difference traffic information of the real-time traffic information which is not selected as the reference traffic information to the in-vehicle terminals.

An eighth aspect of the present invention provides a traffic information distribution apparatus which distributes predicted traffic information regarding a road traffic situation at once to in-vehicle terminals equipped with vehicles, including: a predicted traffic information accumulation unit for accumulating at least a group of a plurality of pieces of the predicted traffic information each of which pertains to a different time that belongs to a same time-line, a reference traffic information selection unit for selecting one piece of the plurality of pieces of the predicted traffic information each of which pertains to a different time that belongs to a same time-line; a difference traffic information generation unit for generating difference traffic information between the predicted traffic information which is not selected as the reference traffic information and the reference traffic information; a traffic information distribution unit for distributing entire information of the predicted traffic information selected as the reference traffic information to the in-vehicle terminals and the difference traffic information of the predicted traffic information which is not selected as the reference traffic information to the in-vehicle terminals.

A ninth aspect of the present invention provides an in-vehicle terminal which is linked to a traffic information distribution apparatus for distributing traffic information, including: a reference traffic information reception unit for receiving as reference traffic information entire information of the traffic information that the traffic information distribution apparatus acquires or generates and includes a predetermined identification information; a traffic information storage unit for storing the received reference traffic information; a distribution request information transmission unit for configuring a distribution request which requests the traffic information distribution apparatus to distribute latest traffic information to include an identification information of the reference traffic information stored in the traffic information storage unit, and transmitting the distribution request information; a difference traffic information reception unit for receiving difference traffic information distributed from the traffic information distribution apparatus in response to the transmitted distribution request information; a traffic information reproduction unit for reproducing the traffic information on the basis of the received difference traffic information and the reference traffic information stored in the traffic information storage unit, wherein the difference traffic information is difference between the latest traffic information and the reference traffic information.

The traffic information distribution apparatus of the present invention includes predetermined identification information in the traffic information acquired or generated, accumulates the traffic information which includes the identification information in the traffic information accumulation unit and distributes the traffic information which includes the identification information to an in-vehicle terminal. The in-vehicle terminal receives the traffic information and holds the traffic information as reference traffic information. Then, the in-vehicle terminal transmits distribution request information including the identification information included in the reference traffic information to the traffic information distribution apparatus. The traffic information distribution apparatus receives the distribution request information, generates difference traffic information between the traffic information specified by the identification information included in the distribution request information and traffic information to be distributed, and distributes the traffic information to the in-vehicle terminal.

Other features and advantages of the present invention will become more apparent from the following detailed descriptions of the invention when taken in conjunction with the accompanying drawings.

BRIEF DESCRIPTION OF THE DRAWINGS

FIG. 3 is a schematic illustration of an example configuration of the traffic information according to the first embodiment of the present invention.

DETAILED DESCRIPTION OF THE INVENTION

Embodiment of the present invention will be explained below in detail with reference to the accompanying drawings.

First Embodiment

Figure 1:
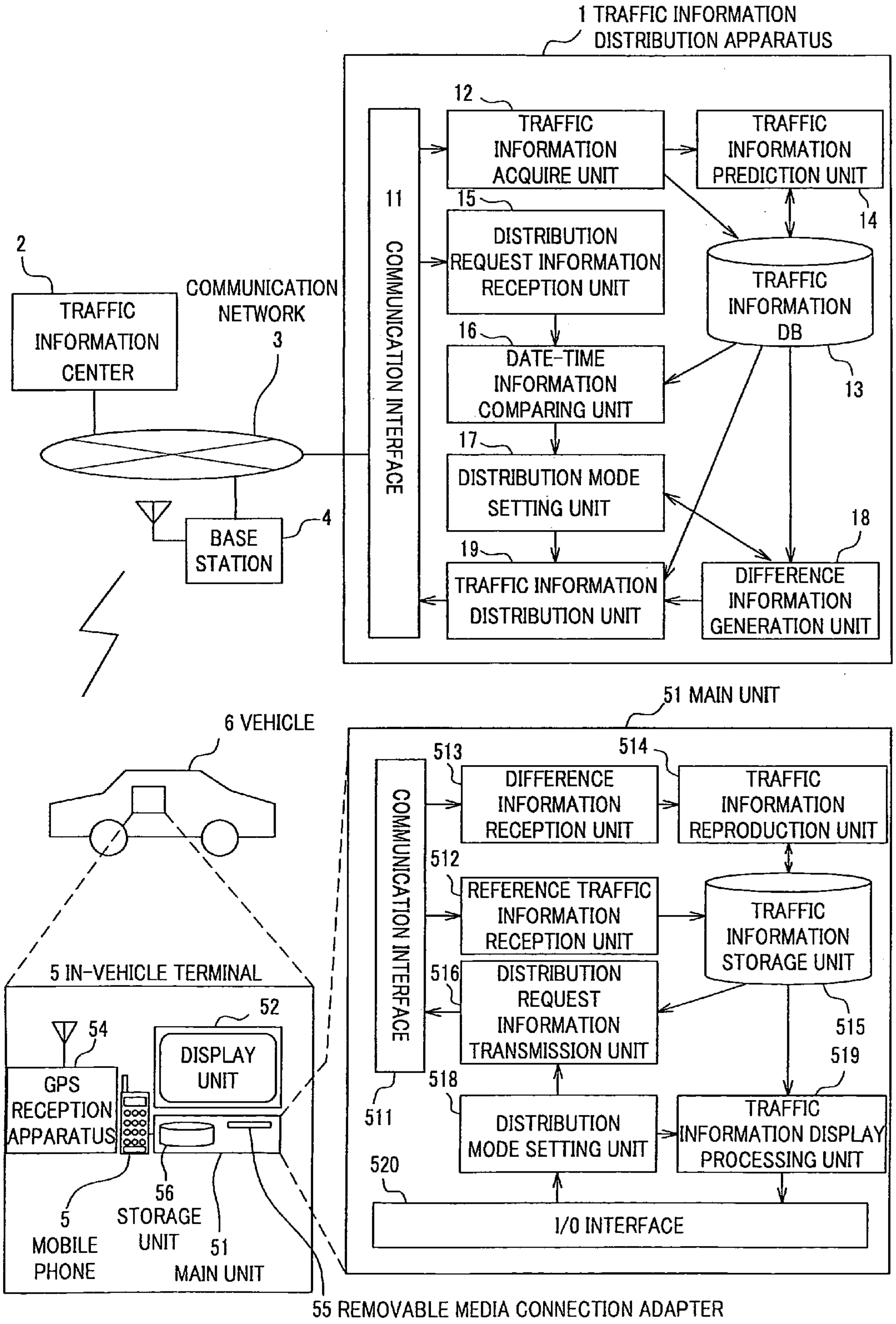
FIG. 1 is an illustration of a configuration example of a traffic information distribution apparatus and an in-vehicle terminal according to a first embodiment and an overall configuration of a traffic information distribution system which employs the traffic information distribution apparatus and the in-vehicle terminal.

FIG. 1 is an illustration of a configuration example of a traffic information distribution apparatus and an in-vehicle terminal according to a first embodiment and an overall configuration of a traffic information distribution system which employs the traffic information distribution apparatus and the in-vehicle terminal. As seen in FIG. 1, the traffic information distribution system according to the first embodiment includes a traffic information distribution apparatus 1, a traffic information center 2, a communication network 3 including the Internet and a public telephone network, a base station 4 of a mobile phone and the like, and an in-vehicle terminal 5 equipped with a vehicle 6.

The traffic information center 2 is, for example, a center computer of VICS (registered trademark). The traffic information center 2 collects information obtained from on-road sensors installed on roads, processes the information in real time and distributes the information to the traffic information distribution apparatus 1 at a predetermined time interval as traffic information indicating a present road situation (link travel-time and a traffic jam length). The traffic information distribution apparatus 1 receives and accumulates the traffic information distributed from the traffic information center 2. The traffic information distribution apparatus 1 also processes the accumulated information in response to a request of the in-vehicle terminal 5, and distributes the processed information to the in-vehicle terminal 5.

The traffic information referred to hereinafter includes information indicating whether or not there is a traffic regulation, construction, accident, and casualty in each link, information on availability of a parking lot and a facility, operational information of a service area and other facilities (e.g. currently-operated, currently out of service, or closed) as well as the link travel-time and the traffic jam length in each link. Types of the traffic information include real-time traffic information, statistical traffic information generated by statistically processing the traffic information, and predicted traffic information generated by processing the statistical traffic information.

A configuration and functions of the traffic information distribution apparatus 1 and the in-vehicle terminal 5 are explained in detail with reference to FIG. 1. For convenience of the explanation, the traffic information referred to in the following explanation is assumed to be the real-time traffic information, however, the traffic information may be any one of the real-time traffic information, the statistical traffic information and the predicted traffic information. Similarly, identification information of the traffic information is assumed to be date-time information indicating a date and time the traffic information pertains to in the following explanation, but string data, image data and binary data may also be used as the identification information instead of the date-time information. Furthermore, the identification information may include information for specifying the type of the traffic information (e.g. the real-time traffic information, the statistical traffic information, the predicted traffic information and the like), and information such as a mesh code for specifying an area, in addition to the date-time information.

The traffic information distribution apparatus 1 is configured by a computer which includes a communication apparatus (not shown) connected to a communication network 3. The computer includes functional blocks such as a communication interface 11, a traffic information acquire unit 12, a traffic information data base (hereinafter also referred to as "a traffic information DB") 13, a traffic information prediction unit 14, a distribution request information reception unit 15, a date-time information comparing unit 16, a distribution mode setting unit 17, a difference traffic information generation unit 18, a traffic information distribution unit 19.

The computer which constitutes the traffic information distribution apparatus 1 also includes at least an arithmetic processing unit and a storage unit such as a semiconductor memory, a hard disk and the like. The function of each functional block 1 to 19 which constitutes the traffic information distribution apparatus 1 is embodied when a predetermined program stored in the storage unit is executed by the arithmetic processing unit.

The communication interface 11 controls a communication via the communication network 3 and transmits data to the traffic information center 2 or the in-vehicle terminal 5 and receives data from the traffic information center 2 or the in-vehicle terminal 5 via the communication network 3. The traffic information acquire unit 12 acquires via the communication interface 11 the real-time traffic information distributed from the traffic information center 2 at a predetermined time interval (e.g. every 5 minutes), and accumulates in the traffic information DB 13 the acquired real-time traffic information in which the date-time information is included indicating a date and time when the real-time traffic information is acquired.

Accumulated in the traffic information DB 13 are the real-time traffic information which contains its date-time information and the statistical traffic information taken, for example, by a date type and a time zone or time and generated by a statistical traffic information generation unit (not shown) which statistically processes the real-time traffic information are. The traffic information prediction unit 14 predicts the traffic information of a time later than the time when the traffic information prediction unit 14 performs the prediction, based on the real-time traffic information acquired by the traffic information acquire unit 12 and the statistical traffic information accumulated in the traffic information DB 13. Then, the traffic information prediction unit 14 accumulates the predicted traffic information in the traffic information DB 13.

The date-time information indicating a time to which the traffic information pertains is included in the traffic information accumulated in the traffic information DB 13, and is used as identification information for identifying each piece of the traffic information accumulated in the traffic information DB 13. If the traffic information is the real-time traffic information, the date-time information indicates a date and time when the real-time traffic information is acquired. If the traffic information is the statistical traffic information, the date-time information indicates a date type and a time zone of a date and time of the statistical target. If the traffic information is the predicted traffic information, the date-time information indicates a future date and time for which the traffic information is predicted.

The distribution request information reception unit 15 receives distribution request information transmitted from the in-vehicle terminal 5. The distribution request information is information for the in-vehicle terminal 5 to request the traffic information distribution apparatus 1 to distribute the traffic information, and contains the date-time information (i.e. the identification information) of the traffic information held by the in-vehicle terminal 5 as reference traffic information (hereinafter also referred to as "in-vehicle terminal holding reference traffic information"). Thus, the in-vehicle terminal 5 is allowed to notify the traffic information distribution apparatus 1 of the date-time information (i.e. identification information) of the reference traffic information the in-vehicle terminal 5 holds.

The date-time information comparing unit 16 compares the date-time information of the in-vehicle terminal holding reference traffic information contained in the distribution request information and the date-time information of the traffic information to be distributed (the latest traffic information), and calculates the time interval between the two pieces of date-time information.

The distribution mode setting unit 17 sets a distribution mode used when the traffic information distribution apparatus 1 distributes the traffic information to the in-vehicle terminal 5. The distribution mode setting unit 17 sets a difference information distribution mode as the distribution mode in a case where the distribution request information contains the date-time information of the in-vehicle terminal holding reference traffic information, the time interval calculated by the date-time information comparing unit 16 is smaller than a predetermined time interval (e.g. 2 hours) and in the traffic information DB 13 there is the traffic information containing the same date-time information as the date-time information of the in-vehicle terminal holding reference traffic information. In other cases, the distribution mode setting unit 17 sets an entire information distribution mode as the distribution mode.

When the difference information distribution mode is set by the distribution mode setting unit 17, the difference traffic information generation unit 18 reads from the traffic information DB 13 the traffic information containing the same date-time information as the date-time information of the in-vehicle terminal holding reference traffic information and the traffic information to be distributed (i.e. the latest traffic information), and generates difference traffic information between the two pieces of the traffic information. The difference traffic information generation unit 18 further calculates the amount of difference between the in-vehicle terminal holding reference traffic information and the traffic information to be distributed (i.e. the divergence degree of the two pieces of the traffic information) by using an indicator such as the ratio of the difference. Then, if the amount of the difference is larger than or equal to a predetermined value, the distribution mode setting unit 17 resets the distribution mode from the difference information distribution mode to the entire information distribution mode.

When the difference information distribution mode is set by the distribution mode setting unit 17, the traffic information distribution unit 19 distributes the difference traffic information generated by the difference traffic information generation unit 18 to the in-vehicle terminal 5. When the entire information distribution mode is set by the distribution mode setting unit 17, the traffic information distribution unit 19 distributes entire information of the latest traffic information to the in-vehicle terminal 5.

The in-vehicle terminal 5 equipped with a vehicle 6 includes a main unit 51, a display unit 52, a mobile phone 53, and a GPS (Global Positioning System) reception apparatus 54.

The main unit 51 is a computer including an arithmetic processing unit (not shown), a storage unit 56, and a removable storage media connection adapter 55. The storage unit 56 is a semiconductor memory, hard disk and the like. The removable storage media connection adapter 55 is a disk drive for DVDs (Digital Versatile Disk), and a reader/writer for USB (Universal Serial Bus) incorporating a flash memory and the like. The main unit 51 may also include switches and buttons for various usages, a touch panel, a remote control apparatus and a microphone as an input apparatus, and a speaker as an output apparatus.

The display unit 52 is a LCD (Liquid Crystal Display) and the like, and displays map information or the traffic information outputted by the main unit 51. The mobile phone 53 performs a wireless communication with the base station 4, and links the in-vehicle terminal 5 to the traffic information distribution apparatus 1 via the base station 4 and the communication network 3. The GPS reception apparatus 54 receives radio waves from GPS satellites and detects a current position of the vehicle 6.

The main unit 51 includes functional blocks such as a communication interface 511, a reference traffic information reception unit 512, a difference traffic information reception unit 513, a traffic information reproduction unit 514, a traffic information storage unit 515, a distribution request information transmission unit 516, a distribution mode setting unit 518, a traffic information display processing unit 519 and an I/O interface 520. These functional blocks of the main unit 51 are embodied when the arithmetic processing unit (not shown) executes a predetermined program stored in the storage unit 56.

The communication interface 511 controls a communication performed by the mobile phone 53 and transmits data to the base station 4 or the traffic information distribution apparatus 1 and receives data from the base station 4 or the traffic information distribution apparatus 1 via the communication network 3. The I/O interface 520 inputs information from the GPS reception apparatus 54, switches and buttons (not shown) and the like, and outputs the map information and the traffic information on the display unit 52.

The reference traffic information reception unit 512 receives the traffic information including its date-time information which is distributed from the traffic information distribution apparatus 1 in the entire information distribution mode, and stores in the traffic information storage unit 515 the traffic information including its date-time information as the latest reference traffic information. At this time, reference traffic information having been stored in the traffic information storage unit 515 is discarded as old reference traffic information. The reference traffic information stored in the traffic information storage unit 515 corresponds to the in-vehicle terminal holding reference traffic information in view of the traffic information distribution apparatus 1.

The difference traffic information reception unit 513 receives difference traffic information which is distributed in the difference information distribution mode from the traffic information distribution apparatus 1.

The traffic information reproduction unit 514 reproduces entire information of predetermined traffic information based on the difference traffic information received by the difference traffic information reception unit 513 and the reference traffic information stored in the traffic information storage unit 515, and stores the reproduced traffic information in the traffic information storage unit 515. At this time, the traffic information reproduction unit 514 discards the reference traffic information which has been stored in the traffic information storage unit 515, and sets the reproduced traffic information in which the date-time information of the difference traffic information is included as the latest reference traffic information.

The traffic information reproduction unit 514 may be configured not to discard the old reference traffic information, and keep it as reference traffic information. In that case, the old reference traffic information and the latest traffic information reproduced by the traffic information reproduction unit 514 coexist in the traffic information storage unit 515, however, practically the latest traffic information is used, for example, when displayed on the display unit 52.

The distribution request information transmission unit 16 transmits distribution request information to the traffic information distribution apparatus 1 to request the traffic information distribution apparatus 1 to transmit the latest traffic information. The distribution request information may include the date-time information of reference traffic information stored in the traffic information storage unit 515, information which specifies the distribution mode, a mesh code for specifying an area, a type of the traffic information (real-time traffic information, statistical traffic information, predicted traffic information and the like) as explained before.

The distribution mode setting unit 518 sets various setting information (e.g. information which specifies the distribution mode) on the basis of information input from the switches and buttons and the like via the I/O interface 520.

The traffic information display processing unit 519 generates display information such as a map of areas surrounding an area where the vehicle 6 is located and the traffic information on the basis of the latest traffic information stored in the traffic information storage unit 515 and map information (not shown) and the like, and outputs the display information to the display unit 52 via the I/O interface 520.

Figure 2:
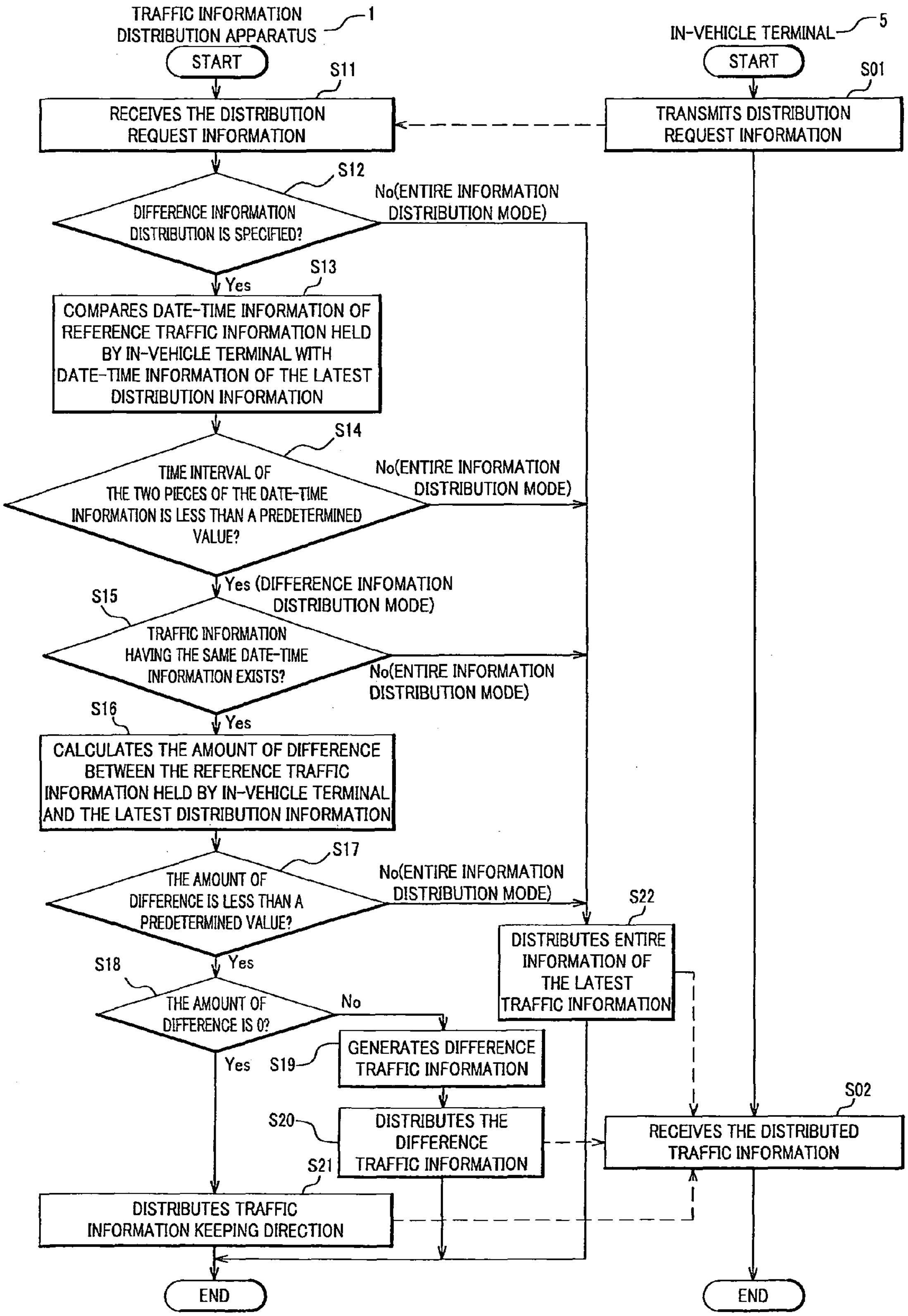
FIG. 2 is a flow chart showing an example processing flow for traffic information distribution performed by the traffic information distribution apparatus and the in-vehicle terminal according to the first embodiment of the present invention.

FIG. 2 is a flow chart showing an example processing flow for distributing traffic information performed by the traffic information distribution apparatus 1 and the in-vehicle terminal 5 according to the first embodiment of the present invention. In the following explanation of the processing flow shown in FIG. 2, the traffic information to be distributed is assumed to be the real-time traffic information (i.e. the latest traffic information among the traffic information accumulated in the traffic information distribution apparatus 1) for convenience of the explanation. Similarly, identification information for identifying the traffic information is assumed to be the date-time information in the following explanation.

In the processing flow shown in FIG. 2, a process performed by the traffic information distribution apparatus 1 is initiated when the in-vehicle terminal 5 transmits predetermined distribution request information to the traffic information distribution apparatus 1 (stepS01). In the following explanation of the processing flow shown in FIG. 2 the distribution request information is assumed to include the date-time information of reference traffic information stored in the traffic information storage unit 515, and distribution mode specifying information which specifies the distribution mode set by the distribution mode setting unit 518.

The distribution mode specifying information is information for specifying the distribution mode which determines whether the traffic information distribution apparatus 1 distributes difference traffic information or entire traffic information. A driver of the vehicle 6 sets the distribution mode specifying information. When the distribution mode specifying information specifies that entire information is to be distributed, the entire information of the traffic information is distributed without exception, but when the distribution mode specifying information specifies that difference information is to be distributed, it is not always true that the difference information is distributed. As explained after step S11, the traffic information distribution apparatus 1 compares reference traffic information and the traffic information to be distributed, and distributes the difference information only in a case where the traffic information distribution apparatus 1 determines it is appropriate to distribute the difference information. In other cases, the traffic information distribution apparatus 1 distributes the entire information.

When the in-vehicle terminal 5 does not hold the reference traffic information, or when reference traffic information the in-vehicle terminal 5 holds is apparently too old (e.g. recorded a year ago), the in-vehicle terminal 5 has to request the traffic information distribution apparatus 1 to distribute new reference traffic information. In this case, the in-vehicle terminal 5 is allowed to request the traffic information distribution apparatus 1 to distribute the latest traffic information (i.e. the reference traffic information) by setting the entire information is to be distributed in the distribution mode specifying information.

Subsequently, the arithmetic processing unit installed in the computer which constitutes the traffic information distribution apparatus 1 receives the distribution request information transmitted from the in-vehicle terminal 5 (step S11). Then, the arithmetic processing unit refers to the distribution mode specifying information contained in the received distribution request information to determine whether difference information is specified to be distributed (stepS12). When the difference information is specified to be distributed (Yes at stepS12), the arithmetic processing unit compares the date-time information of reference traffic information of the in-vehicle terminal 5 contained in the distribution request information (i.e. the date-time information of the in-vehicle terminal holding reference traffic information) and the date-time information of the latest traffic information of the traffic information distribution apparatus 1 (stepS13). When a time interval of the two pieces of the date-time information is less than a predetermined time interval (e.g. 2 hours) (Yes at stepS14), the arithmetic processing unit further determines whether or not there is the traffic information which contains the same date-time information as the date-time information of the in-vehicle terminal holding reference traffic information in the traffic information DB 13 (stepS15).

Then, when it is determined that there is the traffic information which contains the same date-time information as the date-time information of the in-vehicle terminal holding reference traffic information in the traffic information DB 13 (Yes at the stepS15), the arithmetic processing unit sets a difference information distribution mode as the distribution mode, and performs processes of stepS16 and the subsequent steps because the in-vehicle terminal 5 is determined to hold the reference traffic information based on which distribution of the difference information is possible and also appropriate.

When the difference information is not specified to be distributed (No at the stepS12), the time interval of the date-time information of the in-vehicle terminal holding reference traffic information and the date-time information of the latest traffic information stored in the traffic information distribution apparatus 1 is larger than or equal to a predetermined time interval (No at the stepS14), or in the traffic information DB 13 there is no traffic information which contains the same the date-time information as the date-time information of the in-vehicle terminal holding reference traffic information (No at the stepS15), the arithmetic processing unit sets an entire information distribution mode as the distribution mode and distributes entire information of the latest traffic information to the in-vehicle terminal 5 (stepS22).

When the difference information distribution mode is set, the arithmetic processing unit calculates the amount of the difference between the traffic information which contains the same date-time information as the date-time information of the in-vehicle terminal holding reference traffic information (i.e. the in-vehicle terminal holding reference traffic information) and the latest traffic information (stepS16). Then, if the amount of the difference is smaller than a predetermined amount (Yes at stepS17), the arithmetic processing unit further determines whether or not the amount of the difference is 0 (stepS18). When the amount of the difference is not 0 (No at the stepS18), the arithmetic processing unit generates difference traffic information between the in-vehicle terminal holding reference traffic information and the latest traffic information (stepS19) and distributes the generated difference traffic information to the in-vehicle terminal 5 (stepS20).

When the amount of the difference is 0 (Yes at the stepS18), the arithmetic processing unit distributes a traffic information reuse direction which directs the in-vehicle terminal 5 to continue using the reference traffic information which is being used (stepS21).

When the amount of the difference between the in-vehicle terminal holding reference traffic information and the latest traffic information is determined to be larger than or equal to a predetermined amount at the stepS17 (No at the stepS17), the arithmetic processing unit changes the distribution mode to the entire information distribution mode and distributes entire information of the latest traffic information to the in-vehicle terminal 5 (stepS22).

As described above, when the traffic information distribution apparatus 1 receives distribution request information from the in-vehicle terminal 5, the traffic information distribution apparatus 1 distributes either one of entire information or difference traffic information of the latest traffic information, or the traffic information reuse direction to the in-vehicle terminal 5. The in-vehicle terminal 5 receives any one of the information or the direction (stepS02), and updates the reference traffic information stored in the traffic information storage unit 515 on the basis of the entire information or the difference information of the latest traffic information or the traffic information reuse direction. Details of this process will be explained later.

In the processing flow described above, when the amount of the difference is determined to be 0 (Yes at the stepS18), the traffic information reuse direction is distributed to the in-vehicle terminal 5 (stepS21), however, the traffic information reuse direction may also be distributed when the amount of the difference small (e.g. the difference ratio is less than or equal to 5%), which is not 0.

FIG. 3 is a schematic illustration of an example configuration of the traffic information according to the first embodiment of the present invention. Referring to FIG. 3, distribution of difference information will be explained blow. In the following explanation, the link travel-time is used as the traffic information as an example, however, the traffic information may be information on a traffic jam and the like. A link is a road which links adjacent intersections, and the link travel-time is an amount of time required for a vehicle to pass the link.

The link travel-time as the traffic information is acquired by an on-road sensor installed on each link in a predetermined road network and is collected in the traffic information center 2 (refer to FIG. 1). Then, the link travel-time is distributed from the traffic information center 2 to the traffic information distribution apparatus 1 at a predetermined time interval. As seen in FIG. 3, the link travel-time of each link in which the date-time information (T1, T2, and T3) is included which indicates a date and time when the link travel-time is distributed is accumulated in the traffic information DB 13 as a piece of the traffic information. Identification information such as traffic information 1, traffic information 2 and traffic information 3 is included in the traffic information to identify each piece of the traffic information.

A reference numeral 132 in FIG. 3 shows difference traffic information between the traffic information 1 and the traffic information 2, and a reference numeral 133 in FIG. 3 shows difference traffic information between the traffic information 1 and the traffic information 3. In order to successfully distribute the difference traffic information, the in-vehicle terminal 5 must hold the traffic information which is a basis of the difference traffic information. If it is assumed that the traffic information distribution apparatus 1 distributes entire information of the traffic information 1 (information indicated by a bold frame of a reference numeral 131) at the time T1 to the in-vehicle terminal 5, then the in-vehicle terminal 5 holds the entire information of the traffic information 1. In this case, the traffic information distribution apparatus 1 is allowed to distribute only the difference traffic information 132 to the in-vehicle terminal 5 at the time T2, and distribute only the difference traffic information 133 to the in-vehicle terminal 5 at the time T3. By allowing distributing only the difference traffic information as described above, it is possible to reduce the amount of the traffic information distributed.

However, it is not always true that distributing the difference traffic information reduces the amount of the information distributed. When the amount of the difference is large, the amount of the information distributed may increase in some cases. For example, when entire information of the link travel-time is distributed, only the link travel-time is distributed in the order of link numbers, however, when the difference information is distributed, it is necessary to distribute information which couples the link travel-time and its link number. In this case, if the amount of the difference is large, the difference information may become larger than the entire information.

To solve the above problem, the traffic information distribution apparatus 1 determines whether or not distributing the difference information is appropriate before distributing the traffic information (stepS16 in FIG. 2). More specifically, the arithmetic processing unit of the traffic information distribution apparatus 1 counts a number of links which appear in the difference traffic information (132, 133), and calculates a ratio of the number of the links to the number of all links included in a predetermined road network.

Then, if the ratio is smaller than a predetermined value, the traffic information distribution apparatus 1 distributes the difference information. The predetermined value which is a reference for determining whether or not the difference information is distributed may be determined as appropriate according to a type or a configuration of the traffic information (e.g. 50%). The ratio calculated as above can be referred to as a divergence degree between the reference traffic information and the traffic information to be distributed.

Figure 4:
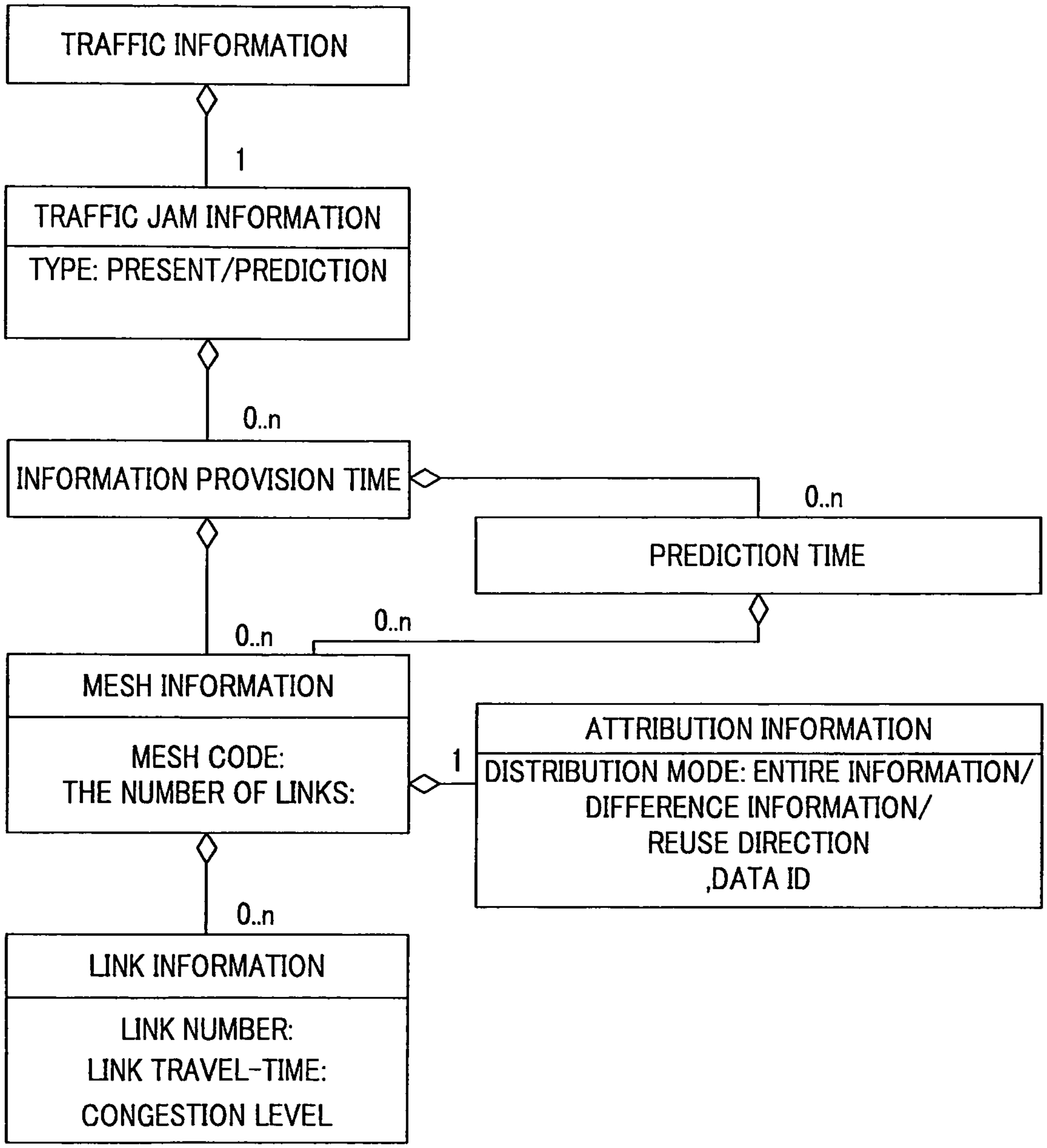
FIG. 4 is an illustration of a specific formation of the traffic information according to the first embodiment of the present invention.

FIG. 4 is an illustration of specific components of the traffic information according to the first embodiment of the present invention. Although the traffic information includes traffic jam information, traffic regulation information, facility (e.g. a service area) congestion information and the like, the traffic jam information is explained in the following explanation. The traffic jam information is information indicating congestion at each link, and the link travel-time is also included in the traffic jam information.

As seen in FIG. 4, the traffic information in this example is composed of the traffic jam information, and types of the traffic jam information includes real-time traffic jam information and predicted traffic jam information. Thus, in this example (i.e. in this embodiment) the traffic jam information can be regarded as the traffic information. The real-time traffic jam information contains a information provision time which indicates a date and time when the real-time traffic jam information is provided (i.e. the date-time information indicating a time when the real-time traffic jam information is distributed from the traffic information center 2 to the traffic information distribution apparatus 1), and the predicted traffic jam information contains a prediction time in addition to the information provision time.

Thus, there is a plurality of pieces of the real-time traffic information, each of which corresponds to each information provision time. As for the predicted traffic jam information, there is a plurality of pieces of the predicted traffic jam information, each of which corresponds to each prediction time, which is set from an information provision time of the real-time traffic information which is a basis of prediction.

The traffic jam information containing the information provision time and the prediction time further includes mesh information. The mesh information is composed of information such as a mesh code and the number of links in a mesh and the like. The mesh described herein is a map block which is formed by dividing a national map in meshes by a predetermined size. Thus, if the number of links equal zero in a mesh, there is no link information in the mesh. The mesh information further includes attribute information which includes the distribution mode such as the entire information distribution mode, the difference information distribution mode and the traffic information reuse direction, and data ID (identification information of the traffic information) and the like. Link information includes information such as a link ID, the link travel-time and a congestion level and the like, and is generated for each link contained in the mesh.

Among the components of the traffic information explained above, a main component of the traffic information is the mesh information (i.e. information classified by the mesh code and including the attribute information and the link information). Thus, an appropriate unit of the traffic information in distributing the traffic information is the traffic information classified by the mesh code. The type of the traffic information (i.e. the real-time traffic information or the predicted traffic information), the information provision time and the prediction time (in a case of the predicted traffic information) is included in each piece of the traffic information classified by the mesh code, and thus each piece of the traffic information classified by the mesh code is treated as different traffic information. Therefore, the traffic information can be identified by specifying the type of the traffic information, the information provision time and the prediction time (in a case of the predicted traffic information). In this embodiment, data ID is further included in the traffic information as the attribute information included in the mesh information for readily identifying the traffic information. Thus, each piece of the traffic information can also be identified by the data ID.

Figure 5:
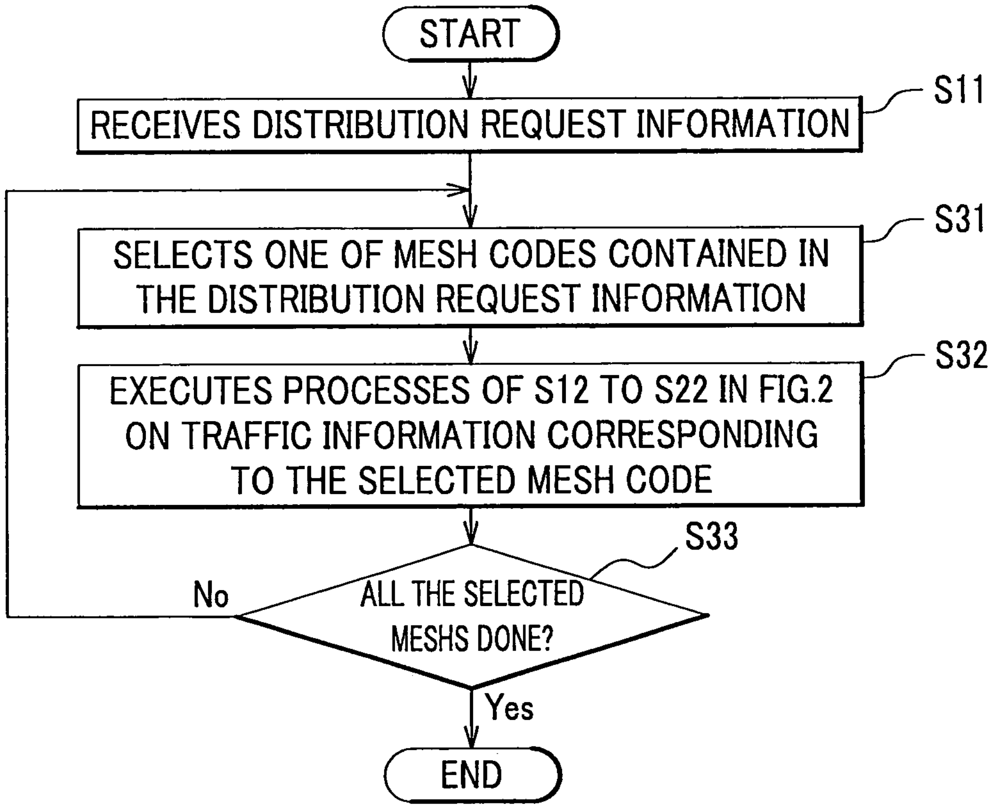
FIG. 5 is an example processing flow modified from the processing flow for distributing the traffic information performed by the traffic information distribution apparatus shown in FIG. 2 on the basis of the formation of the traffic information shown in FIG. 4.

FIG. 5 is an example of a processing flow modified from the processing flow shown in FIG. 2 for distributing the traffic information performed by the traffic information distribution apparatus 1 on the basis of the formation of the traffic information shown in FIG. 4. In this processing flow, the distribution request information transmitted from the in-vehicle terminal 5 contains at least one mesh code which indicates the traffic information of which area is desired, the information provision time (the date-time information) of reference traffic information held by the in-vehicle terminal 5 and information specifying the distribute mode for each mesh code.

When the arithmetic processing unit of the traffic information distribution apparatus 1 receives the distribution request information (step S11), the arithmetic processing unit selects one of the mesh codes contained in the distribution request information (stepS31). Then, the arithmetic processing unit executes the processes of the steps S12 to S22 shown in FIG. 2 on the traffic information corresponding to the mesh code as a unit to be processed (stepS32). In this case, the arithmetic processing unit executes the processes of the steps S12 to S22 on the traffic information corresponding to the mesh code selected by the stepS31.

The arithmetic processing unit then determines whether or not all mesh codes contained in the distribution request information are selected (stepS33). When all the mesh codes are not selected (No at the stepS33), the arithmetic processing unit repeats the processes of the steps S31 to S33. When all the mesh codes are selected, (Yes at the stepS33), the arithmetic processing unit exits the processing for distributing the traffic information.

Because the processed unit of the traffic information in the above processes is generally a plurality of pieces of the traffic information each piece of which is specified by the mesh code and the information provision time (the date-time information), the traffic information distribution apparatus 1 is allowed to distribute entire information or difference information of each piece of the traffic information in response to a request from the in-vehicle terminal 5.

Figure 6:
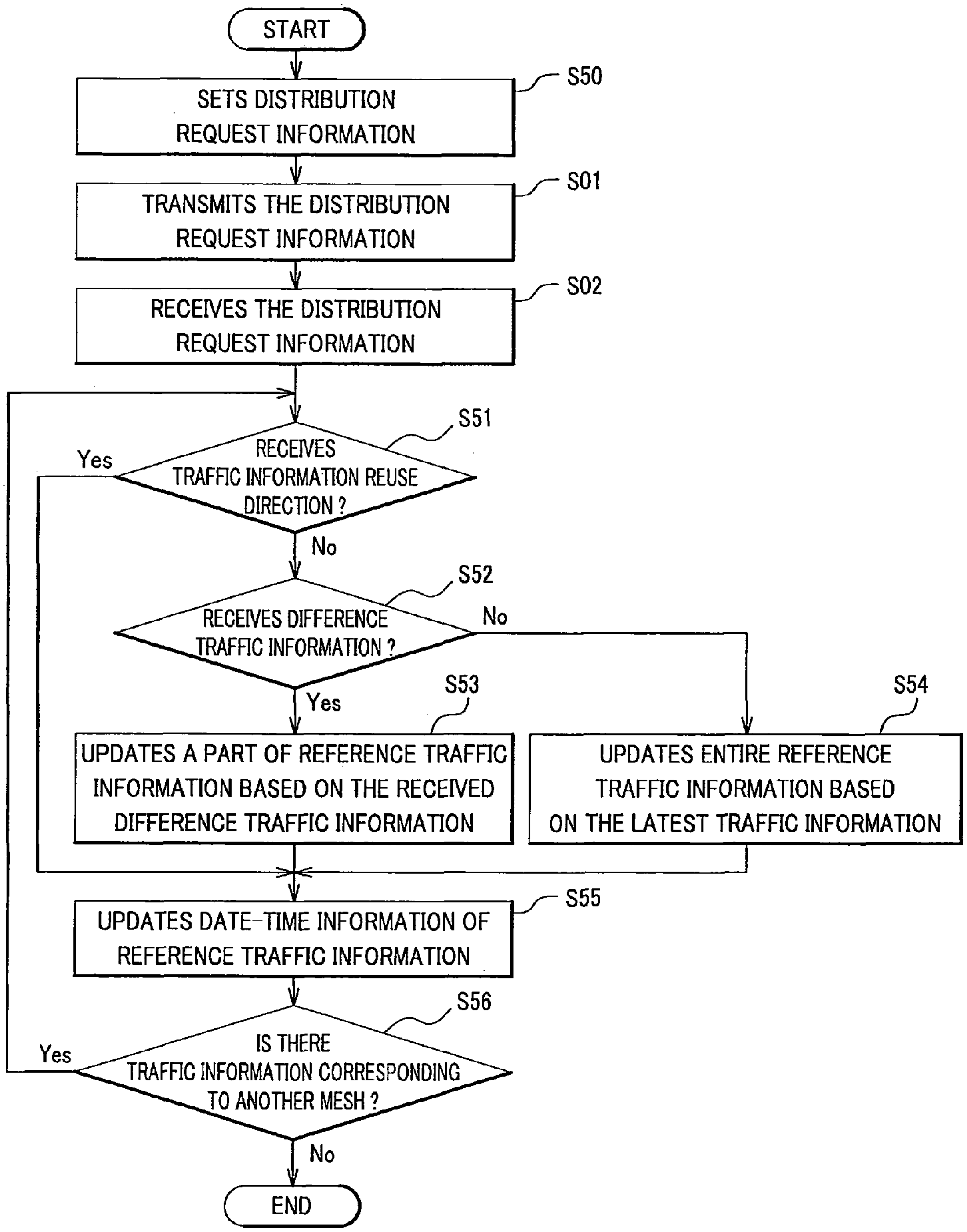
FIG. 6 is a flow chart for updating reference traffic information of the in-vehicle terminal according to the first embodiment of the present invention.

FIG. 6 is a flow chart for updating reference traffic information of the in-vehicle terminal 5 according to the first embodiment of the present invention. When the in-vehicle terminal 5 (refer to FIG. 1) seeks to set or update the reference traffic information stored in the traffic information storage unit 515, the arithmetic processing unit (not shown) of the in-vehicle terminal 5 firstly sets the distribution request information (stepS50), and then transmits the set distribution request information to the traffic information distribution apparatus 1 (step S01).

In setting the distribution request information (the stepS50), the arithmetic processing unit of the in-vehicle terminal 5 sets information specifying that the real-time traffic information or the predicted traffic information of which area (which mesh code) is requested, and information specifying whether entire information is requested or difference information is requested, and the like. In this embodiment, the arithmetic processing unit automatically performs the setting of the mesh code by, for example, automatically selecting a mesh including the place where the vehicle 6 is located and other meshes within a predetermined range which surrounds the mesh on the basis of the place where the vehicle 6 is located and a target place. Information which specifies whether entire information is requested to be distributed or difference information is requested to be distributed (distribution mode specifying information) is set for each mesh, for example, by displaying a map including meshes indicated by the mesh codes, and processing information input via a touch panel on the displayed map. At this time, the distribution mode specifying information does not have to be set for each mesh, but the same distribution mode specifying information may be set for all the meshes at once. The setting of the distribution mode specifying information may be performed by an input operation using a sound interface or a remote controller, without limitation to the input operation via the touch panel.

Next, the arithmetic processing unit of the in-vehicle terminal 5 receives the traffic information distributed from the traffic information distribution apparatus 1 in response to the transmitted distribution request information (stepS02). The traffic information distributed at this time is either one of entire information of the traffic information, difference traffic information or a traffic information reuse direction corresponding to the specified mesh. Information for identifying the entire information, the difference traffic information or the traffic information reuse direction is contained in the attribute information of the mesh information of the traffic information (refer to FIG. 4).

Then the arithmetic processing unit determines the type of the traffic information based on the attribute information of the mesh information. When the traffic information reuse direction is received (Yes at stepS51), the arithmetic processing unit updates the date-time information of the reference traffic information corresponding to the mesh code in question, based on the mesh code and the date-time information (the information provision time) contained in the traffic information reuse direction (stepS55).

When the traffic information reuse direction is not received (No at the stepS51), and the difference traffic information is received (Yes at the stepS52), the arithmetic processing unit updates a part of the reference traffic information corresponding to the mesh code contained in the difference traffic information which is different from the difference traffic information, based on the received difference traffic information (stepS53). Then, the arithmetic processing unit updates the date-time information of the reference traffic information, based on the date-time information (the information provision time) contained in the received difference traffic information (stepS55), When the traffic information reuse direction is not received (No at the stepS51) and the difference traffic information is not received either (No at the stepS52), the received traffic information is entire information of the latest traffic information corresponding to a mesh specified by the mesh code contained in the received traffic information. In this case, the arithmetic processing unit updates all parts of the reference traffic information corresponding to the mesh code on the basis of the received latest traffic information (step S54), and also updates the date-time information of the reference traffic information on the basis of the date-time information (the information provision time) contained in the received traffic information (stepS55).

When the above processes are completed, in-vehicle terminal 5 finishes updating the reference traffic information based on the received traffic information corresponding to one mesh. Then, when there is the traffic information corresponding to other meshes in the received traffic information (Yes at stepS56), the arithmetic processing unit repeats the processes of the stepS51 to stepS55. When there is no traffic information corresponding to other meshes in the received traffic information (No at stepS56) the arithmetic processing unit finishes receiving the traffic information.

In the above processing flow, the arithmetic processing unit updates the date-time information of the reference traffic information when the arithmetic processing unit updates the reference traffic information based on entire information of the latest traffic information or the difference traffic information and when the arithmetic processing unit receives the traffic information reuse direction. However, the update of the date-time information of the reference traffic information may be limited to be performed only in the case where the arithmetic processing unit receives the entire information of the latest traffic information (No at the stepS52). In this case, the traffic information distributed as the difference traffic information and practically used to be displayed and the reference traffic information whose entire information has been before distributed coexist.

In the above processing flow, the arithmetic processing unit determines the type of the traffic information (entire information, difference traffic information and traffic information reuse direction) by referring to the attribute information of the mesh information of the traffic information after receiving the traffic information. However, the traffic information distribution apparatus 1 may be configured to distribute the attribute information before distributing the traffic information, and the in-vehicle terminal 5 may also be configured to determine the type of the traffic information on the basis of the attribute information which is distributed before the traffic information.

In this case, when the type of the traffic information is different from that the type of the traffic information set in the distribution mode specifying information contained in the distribution request information, the arithmetic processing unit displays the inconsistency on the display unit 52 and also displays a button for selecting whether or not a driver receives the traffic information. With this button, the driver of a vehicle is allowed to cancel receiving the traffic information to be distributed in a distribution mode not expected.

The description has been made on a case where the traffic information is mainly the real-time traffic information. Next, a case where the traffic information is the predicted traffic information will be explained. It is to be noted that there are two methods of distributing the traffic information when the traffic information is the predicted traffic information.

A first method is employed in a case where the in-vehicle terminal 5 holds the reference traffic information and requests by the distribution request information the predicted traffic information by specifying one prediction request time. In this case, the predicted traffic information can be distributed in substantially the same way as the way of distributing the real-time traffic information, which is explained above. The first method can be applied, for example, to a case where the in-vehicle terminal 5 requests distribution of the predicted traffic information which is fifteen minutes later than the latest traffic information just received, which is set as reference traffic information.

A second method is employed in a case where the in-vehicle terminal 5 specifies a plurality of prediction request times which belongs to the same time-line and requests a plurality of pieces of the predicted traffic information, each of which corresponds to each prediction request time. In this case, entire information of the predicted traffic information corresponding to the first prediction request time is distributed as reference predicted traffic information, and the predicted traffic information corresponding to the subsequent prediction request times can be distributed as difference traffic information. Thus, in this case, the in-vehicle terminal 5 does not have to hold the reference traffic information in advance. A processing flow of distributing the predicted traffic information in the second method will be explained below.

Figure 7:
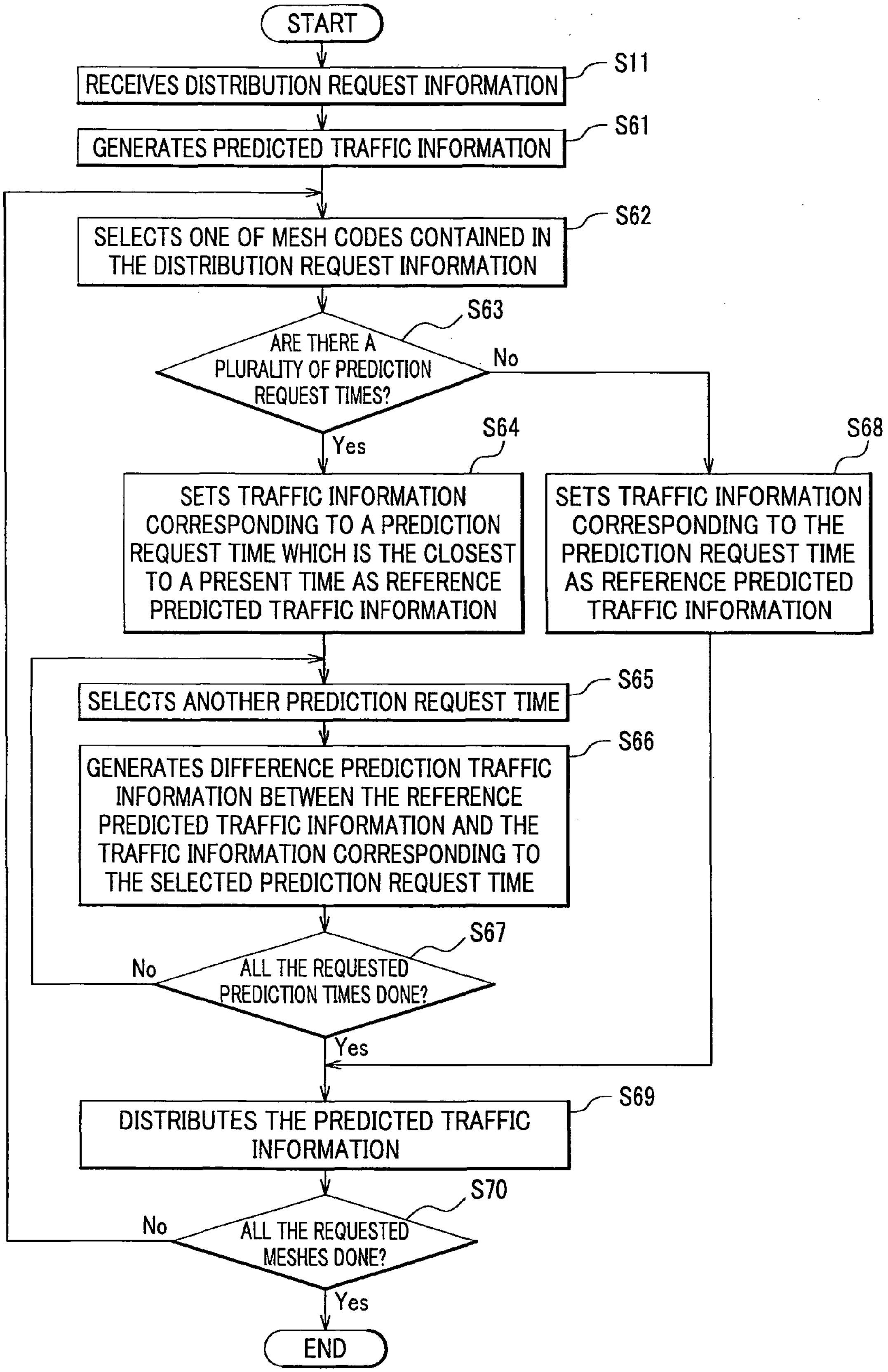
FIG. 7 is a flow chart of an example processing for distributing predicted traffic information performed by the traffic information distribution apparatus according to the first embodiment of the present invention.

FIG. 7 is a flow chart of an example processing for distributing the predicted traffic information performed by the traffic information distribution apparatus 1 according to the first embodiment of the present invention. As seen in FIG. 7, when the arithmetic processing unit of the traffic information distribution apparatus 1 receives distribution request information from the in-vehicle terminal 5 (step S11), and further receives a distribution request in the distribution request information for requesting a plurality of the predicted traffic information each piece of which corresponds to a prediction request time which belongs to the same time-line, the arithmetic processing unit predicts a plurality of the traffic information each piece of which corresponds to the plurality of the prediction request time (stepS61). At this time, a prediction target area is an area which at least includes a mesh specified by a mesh code contained in the distribution request information. The predicted traffic information corresponding to each prediction request time is stored in the traffic information DB 13.

Next, the arithmetic processing unit selects one of the mesh codes contained in the distribution request information (stepS62). Then, the arithmetic processing unit determines whether or not there is a plurality of the prediction request times specified in the distribution request information (stepS63). When there is the plurality of the prediction request times (Yes at the stepS63), the arithmetic processing unit sets as reference predicted traffic information the predicted traffic information corresponding to a prediction request time which is the closest to the present time among the plurality of the prediction request times (stepS64).

Next, the arithmetic processing unit selects one of the other prediction request times among the plurality of the prediction request times (stepS65), and generates difference predicted traffic information which is difference between the reference predicted traffic information and the predicted traffic information corresponding to the selected prediction request time (stepS66). Then, the arithmetic processing unit determines whether or not all the prediction request times specified in the distribution request information is selected (stepS67). When all the prediction request times is not selected (No at stepS67), the arithmetic processing unit returns the process to the stepS65 and repeats the processes of the stepS65 to the stepS67.

When all the prediction request times specified in the distribution request information is selected (Yes at the stepS67), the arithmetic processing unit distributes the predicted traffic information (the reference predicted traffic information and the difference predicted traffic information) corresponding to each prediction request time to the in-vehicle terminal 5 (stepS69). At this time, entire information of the reference predicted traffic information is distributed. Subsequently, the arithmetic processing unit determines whether or not all mesh codes contained in the distribution request information is selected (stepS70). When all the mesh codes is not selected (Yes at the stepS70), the arithmetic processing unit returns the process to the stepS62 and repeats the processes of the stepS62 to the stepS70.

When it is determined that there is only one prediction request time specified in the distribution request information at the stepS63 (No at the stepS63), the arithmetic processing unit sets the predicted traffic information corresponding to the prediction request time as the reference predicted traffic information (stepS68), and distributes the reference predicted traffic information as requested traffic information to the in-vehicle terminal 5 (stepS69).

When it is determined that all the mesh codes contained in the distribution request information is selected at the stepS70, it means all predicted traffic information corresponding to the specified meshes is distributed, and thus the arithmetic processing unit finishes processing for distributing the predicted traffic information.

When difference predicted traffic information is generated in the above processing flow, the difference predicted traffic information is simply generated without any other processes as described above (stepS66). However, when the difference predicted traffic information is generated, the arithmetic processing unit may calculate the amount of the difference from the reference predicted traffic information and distribute entire predicted traffic information or the traffic information reuse direction instead of the difference predicted traffic information according to the amount of the difference or a ratio of the difference, similarly to the processes of the stepS16 to the stepS21 shown in FIG. 2.

At the stepS64, the prediction request time which is the closest to the present time is selected as the reference predicted traffic information among the plurality of prediction request times contained in the distribution request information. However, any one of the prediction request time that is arbitrarily chosen among the plurality of prediction request times may be selected as the reference predicted traffic information.

The processing flow shown in FIG. 7 for distributing the predicted traffic information can be applied to a processing flow for distributing the statistical traffic information.

In accordance with the first embodiment of the present invention, because the in-vehicle terminal 5 includes the mesh code and the date-time information of the reference traffic information held by the in-vehicle terminal 5 in the distribution request information, and then transmits the distribution request information to the traffic information distribution apparatus 1, the traffic information distribution apparatus 1 is allowed to generate and distribute the difference traffic information. Even if the difference traffic information cannot be generated, because the traffic information distribution apparatus 1 can distribute entire information of the traffic information, it is possible to improve the reliability of distribution of the traffic information.

In accordance with the first embodiment, the traffic information distribution apparatus 1, as shown in the process at the stepS14 in FIG. 2, compares the date-time information of the reference traffic information held by the in-vehicle the terminal 5 and the date-time information of the traffic information to be distributed, and if the time interval of the two pieces of the date-time information is larger than or equal to a predetermined time interval (e.g. 2 hours), the traffic information distribution apparatus 1 distributes entire information of the traffic information. Thus, if the reference traffic information is too old (i.e. older than the traffic information to be distributed by more than the predetermined time interval), the in-vehicle terminal 5 can receive the entire information of the latest traffic information. Therefore, it is possible to update the reference traffic information without failing. Also in accordance with the first embodiment, the traffic information distribution apparatus 1 distributes difference traffic information only when the traffic information distribution apparatus 1 determines it is appropriate to distribute the difference traffic information based on a calculation result of the amount of the difference as shown in FIG. 2. Therefore, the amount of the traffic information distributed will be reduced. Also, even when the in-vehicle terminal 5 fails to receive the difference traffic information due to a temporal radio disturbance and the like, as long as the in-vehicle terminal 5 holds the reference traffic information, the in-vehicle terminal 5 is allowed to request distribution of the difference traffic information again by including the identification information of the reference traffic information in the distribution request information. Thus, it is possible to improve reliability of distribution of the traffic information.

Next, a modification of the first embodiment will be explained.

Figure 8:
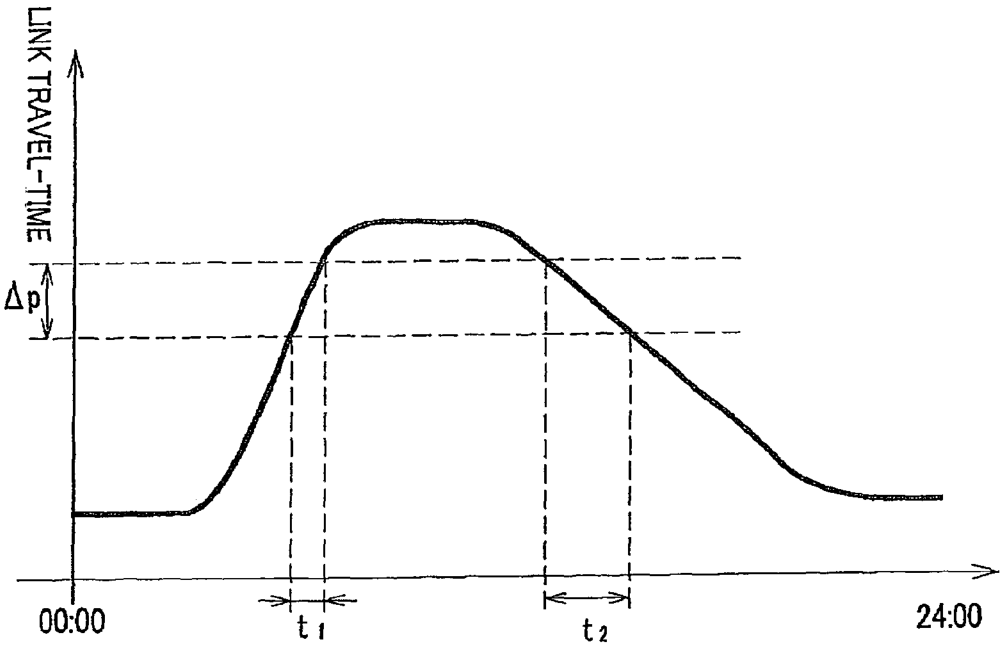
FIG. 8 is an example graph showing a link travel-time transition of a representative link in a day.

FIG. 8 is an example graph showing a link travel-time transition of a representative link in a day. The example graph is obtained by statistically processing the link travel-time transition of the representative link "Li" by a date type (e.g. week day or holiday and the like). Such information is generally stored in the traffic information DB 13 as the statistical traffic information.

In the example graph shown in FIG. 8, the link travel-time is short at early morning, sharply increases at morning and reaches its peak during the daytime, and then sharply decreases at evening and becomes short again at midnight. In a time zone in the morning when the link travel-time sharply increases, it takes time "T1" for the link travel-time to increase Δp. At a time in the evening when the link travel-time sharply decreases, it takes time "T2" for the link travel-time to decrease Δp. In such time zones when the link travel-time sharply changes, the link travel-times of many links are expected to be changed sharply. Therefore, at such time zones, the amount of the difference will be large when the difference traffic information is generated In view of the above circumstances, the arithmetic processing unit of the traffic information distribution apparatus 1 is configured to set "the predetermined time interval" which is a threshold value of the process at the stepS14 shown in FIG. 2 to be large during a time zone where the link travel-time does not change sharply, and sets "the predetermined time interval" to be short during a time zone where the link travel-time sharply changes, referring to the statistical traffic information. In other words, at the morning and the evening when a traffic volume (i.e. the link travel-time) sharply changes, the reference traffic information of the in-vehicle terminal 5 is updated in a short time circle, and at the early morning and the midnight when the traffic volume (i.e. the link travel-time) does not change sharply, the reference traffic information is not updated frequently.

At the stepS16 and the stepS17 shown in FIG. 2, the arithmetic processing unit of the traffic information distribution apparatus 1 calculates the amount of the difference between the traffic information to be distributed and the reference traffic information, and determines whether the traffic information distribution apparatus 1 distributes the difference traffic information or distributes entire information on the basis of the amount of the difference calculated. However, the arithmetic processing unit may determine whether the traffic information distribution apparatus 1 distributes the difference traffic information or distributes entire information on the basis of a changing rate of the link travel-time of a representative link by referring to the statistical traffic information. In other words, when the changing rate of the link travel-time is larger than or equal to a predetermined changing rate, entire information is distributed, and when the changing rate of the link travel-time is less than the predetermined changing rate, the difference information is distributed. In this case, because sometimes the difference traffic information does not have to be generated, it is possible to reduce a load on the arithmetic processing unit of the traffic information distribution apparatus 1.

The first embodiment may be further modified as explained below.

When the in-vehicle terminal 5 holds the statistical traffic information (the statistical traffic information taken by a date type and a time zone), the statistical traffic information can be used as the reference traffic information. In this case, even though information which specifies the reference traffic information is not contained in the distribution request information transmitted from the in-vehicle terminal 5 (it is to be noted that the mesh code must be always contained), the traffic information distribution apparatus 1 is allowed to generate the difference traffic information between the statistical traffic information corresponding to a date type and a time zone the present time belongs to and the traffic information to be distributed, and distribute the generated difference traffic information to the in-vehicle terminal 5.

This embodiment can be further extended as explained below. The extended embodiment is realized in a case where the in-vehicle terminal 5 holds a plurality of pieces of reference traffic information. In this case, the in-vehicle terminal 5 includes identification information in each piece of the plurality of pieces of the reference traffic information and includes the plurality of pieces of the reference traffic information in the distribution request information, and transmit the distribution request information to the traffic information distribution apparatus 1. The traffic information distribution apparatus 1 calculates the amounts of the differences between the traffic information to be distributed and each piece of the plurality of pieces of the reference traffic information (the traffic information retrieved from the traffic information DB 13 and specified by the identification information included in the distribution request information). Then, the traffic information distribution apparatus 1 generates the difference traffic information between the traffic information to be distributed and the reference traffic information which is least different from the traffic information to be distributed. After that, the traffic information distribution apparatus 1 includes the identification information of the reference traffic information which is selected as a reference when generating the difference traffic information in the difference traffic information, and distributes the difference traffic information to the in-vehicle terminal 5.

The in-vehicle terminal 5 is allowed to receive the distributed difference traffic information and to reproduce entire information of the traffic information to be distributed on the basis of the received difference traffic information and the reference traffic information specified by the identification information included in the difference traffic information. Thus, it is possible to further reduce the amount of the traffic information distributed, whereby a communication load and communication cost on the communication network 3 is also reduced.

Second Embodiment

Figure 9:
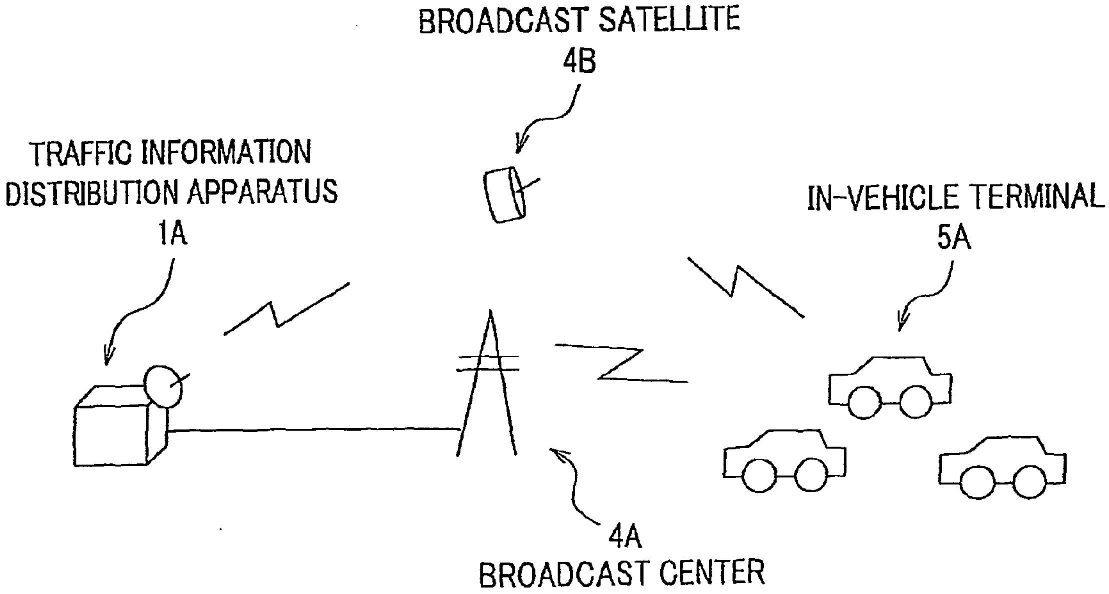
FIG. 9 is a view showing an overall configuration of a traffic information distribution system in which a traffic information distribution apparatus and an in-vehicle terminal according to a second embodiment of the present invention are employed.

FIG. 9 is a view showing an overall configuration of a traffic information distribution system in which a traffic information distribution apparatus and an in-vehicle terminal according to a second embodiment of the present invention are employed. As seen in FIG. 9, in the second embodiment, the traffic information distribution apparatus 1A distributes the traffic information to the in-vehicle terminal 5A by predetermined airwaves via a broadcast center 4A or a broadcast satellite 4B.

Figure 10:
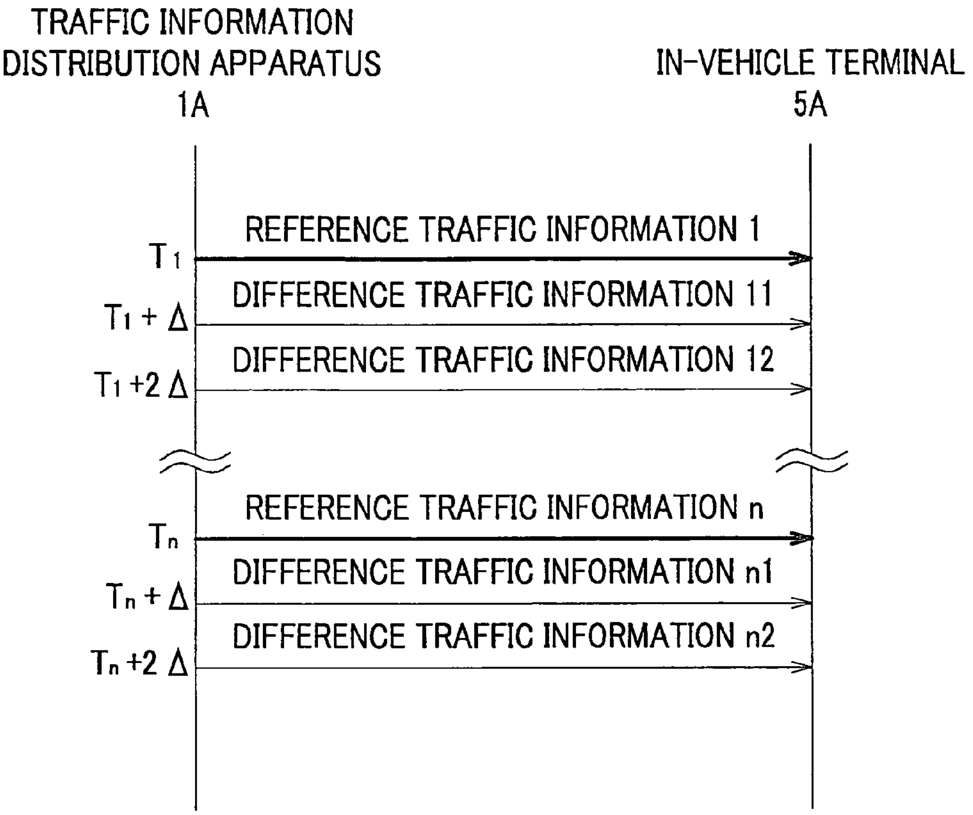
FIG. 10 is an illustration showing a flow of distributing the traffic information from the traffic information distribution apparatus according to the second embodiment of the present invention to the in-vehicle terminal according to the second embodiment of the present invention.

FIG. 10 is an illustration showing a flow for distributing traffic information from the traffic information distribution apparatus according to the second embodiment of the present invention to the in-vehicle terminal. In the second embodiment, because the traffic information distribution apparatus 1A cannot acquire date-time information of the traffic information held by the in-vehicle terminal 5A, the traffic information distribution apparatus 1A distributes entire information of predetermined traffic information as reference traffic information 1 at first (at a time "T1"). Subsequently, the traffic information distribution apparatus 1A distributes the traffic information at a certain time interval Δ "e.g. 5 minutes). At this time, the traffic information distribution apparatus 1A distributes difference traffic information 11, 12, between the reference traffic information 1 and the latest traffic information, whereby it is possible to reduce the amount of information distributed.

When the traffic information is distributed by an airwave, the traffic information distribution apparatus 1A does not have information on the condition of the in-vehicle terminal 5A which receives the traffic information distributed. For example, the in-vehicle terminal 5A equipped with a vehicle which has just started to be driven generally does not hold reference traffic information. Thus, the traffic information distribution apparatus 1A, so as to distribute the reference traffic information to the in-vehicle terminal 5A, distributes entire information of the traffic information as the reference information one time out of a predetermined times the difference traffic information is distributed. When the predetermined times are six times and Δ is five minutes, the reference traffic information is distributed at a time "Tn", which is every thirty minutes from the time "T1".

As explained above, by distributing the reference traffic information one time out of the predetermined times the difference traffic information is distributed, the in-vehicle terminal 5A is allowed to acquire the reference traffic information by waiting at least, e.g. thirty minutes. Thus, because larger numbers of the in-vehicle terminals 5A are allowed to reproduce entire information of the traffic information based on the received difference traffic information, it is possible to improve the efficiency and reliability of distributing the traffic information. Because the reference traffic information is updated at a predetermined time interval (e.g. every thirty minutes), a time difference between a time when the difference traffic information is distributed and a time the reference traffic information is distributed is less than the predetermined time interval, whereby it is possible to prevent the amount of the difference traffic information to be large. Thus, it is also possible to further improve efficiency of reducing the amount of information distributed.

The flow for distributing the traffic information explained above can be also applied to distribution of the predicted traffic information which is predicted for each of a plurality of prediction request times belonging to the same time-line. In this case, the predicted traffic information does not have to be distributed at a time interval Δ, and a plurality of pieces of the predicted traffic information can be distributed without any time lag as long as a partition of each of the plurality of pieces of the predicted traffic information can be recognized.

Figure 11:
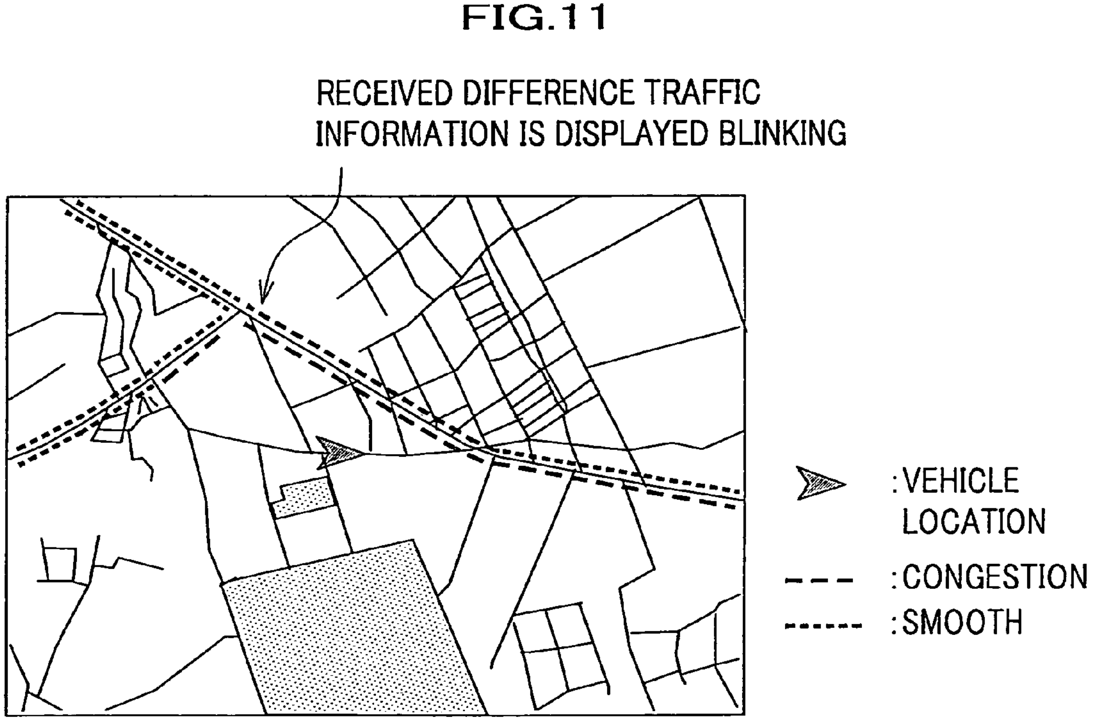
FIG. 11 is an illustration of example traffic information displayed on a display unit of the in-vehicle terminal according to the second embodiment of the present invention.

FIG. 11 is an illustration of example traffic information displayed on the display unit 52 of the in-vehicle terminal 5A according to the second embodiment of the present invention. When the in-vehicle terminal 5A receives the difference traffic information, because the in-vehicle terminal 5A can detect a difference from the reference traffic information without specially processing the difference traffic information, the in-vehicle terminal 5A can readily display the difference traffic information on a map and the like. For example, in FIG. 11, traffic jam information which has been displayed before (reference traffic information) is displayed in dished line, and traffic information which is changed from the reference traffic information (difference traffic information) is displayed in blinking dashed line.

In the second embodiment, the reference traffic information is only distributed a time out of, for example, six times the traffic information is distributed. Thus, five times out of the six times the difference traffic information from the reference traffic information is distributed. When two pieces of the difference traffic information is distributed continuously, the difference traffic information distributed after does not represent a difference from the difference traffic information distributed before.

In this case, the in-vehicle terminal 5 compares the difference traffic information received before or the traffic information reproduced by the traffic information reproduction unit 514 from the difference traffic information received before with the difference traffic information received after. Then, a difference calculated by the comparison (i.e. traffic jam information indicated by the difference traffic information received after) is displayed on the display unit 52, for example, by blinking the difference.

In order to display the difference from the traffic information which has been displayed as explained above, the in-vehicle terminal 5A has to store in the storage unit 56 information such as a vehicle location, a destination, a place to be passed, an area around a pathway and a displayed area which have been used for displaying the traffic information before.

By highlighting the difference traffic information or the traffic information changed as explained above, a driver of a vehicle is allowed to grasp the change of the traffic information easily. It is to be understood that the difference traffic information may be displayed colored or bolded, not limited to be displayed in dashed line, as long as the difference traffic information is easy to recognize. The difference traffic information may be just displayed in a list, without limited to be displayed on a map, and the contents of the list may be announced by voice.

As explained above, the in-vehicle terminal 5A can display the difference traffic information in various ways. In the second embodiment, the in-vehicle terminal 5A is configured such that the in-vehicle terminal 5A can display the difference traffic information in all the ways explained above, and further includes a user interface screen displayed on the display unit 52, and the in-vehicle terminal 5A allows a user to select how the difference traffic information is displayed by an input operation via the user interface screen, a touch panel and a remote controller and the like The ways of displaying the traffic information explained above can be applied to the first embodiment without limitation to the second embodiment.

The embodiments according to the present invention have been explained as aforementioned. However, the embodiments of the present invention are not limited to those explanations, and those skilled in the art ascertain the essential characteristics of the present invention and cam make the various modifications and variations to the present invention to adapt it to various usages and conditions without departing from the spirit and scope of the claims.

What is claimed is:

1. A traffic information distribution method implemented in a computer which distributes predicted traffic information regarding a road traffic situation individually to each of in-vehicle terminals equipped with vehicles, the computer comprising a predicted traffic information accumulation unit for accumulating at least a group of a plurality of pieces of the predicted traffic information, each piece of which pertains to a different time that belongs to a same time-line, the method allowing the computer to perform the steps comprising:

a distribution request information reception step of receiving from the in-vehicle terminal distribution request information which requests the computer to distribute the predicted traffic information;

a reference information selection step of selecting one of the plurality of pieces of the predicted traffic information, each piece of which pertains to a different time that belongs to the same time-line, as reference traffic information, when the received distribution request information contains a distribution request for requesting the plurality of pieces of the predicted traffic information, each piece of which pertains to a different time that belongs to a same time-line;

a difference traffic information generation step of generating difference traffic information between the predicted traffic information, which is not selected as the reference traffic information, and the reference traffic information; and a traffic information distribution step of distributing entire information of the selected predicted traffic information and only the difference traffic information of non-selected predicted traffic information to the in-vehicle terminal.

2. A traffic information distribution apparatus which acquires or generates traffic information on a road traffic situation and distributes the traffic information individually to each of in-vehicle terminals equipped with vehicles, the apparatus comprising:

a traffic information accumulation unit configured to include predetermined identification information in the traffic information and accumulate in a storage device the traffic information which includes the identification information when the traffic information distribution apparatus acquires or generates the traffic information;

a distribution request information reception unit configured to receive distribution request information transmitted from the in-vehicle terminal and contain identification information included in reference traffic information the in-vehicle terminal holds at the time when the in-vehicle terminal transmits the distribution request information;

a difference traffic information generation unit configured to generate difference traffic information between the traffic information stored in the storage device and having a same identification information as the identification information included in the reference traffic information contained in the received distribution request information and the traffic information which is to be distributed at the time when the difference traffic information is generated; and a traffic information distribution unit configured to distribute the generated difference traffic information to the in-vehicle terminal.

3. The traffic information distribution apparatus of claim 2, further comprising:

a distribution mode setting unit configured to calculate a divergence degree between the traffic information stored in the storage device and having the same identification information as the identification information of the reference traffic information contained in the received distribution request information and the traffic information to be distributed, and setting a difference information distribution mode if the divergence degree is less than a predetermined value, and setting an entire information distribution mode if the divergence degree is larger than or equal to the predetermined value, wherein the traffic information distribution unit:

distributes the difference traffic information generated by the difference traffic information generation unit when the difference information distribution mode is set by the distribution mode setting unit, and distributes entire information of the traffic information to be distributed when the entire information distribution mode is set by the distribution mode setting unit.

4. The traffic information distribution apparatus of claim 3, wherein the identification information included in the traffic information is date-time information indicating a date and time the traffic information pertains to, and the traffic information distribution apparatus comprises:

a date-time information comparing unit configured to compare the date-time information contained in the distribution request information received by the distribution request information reception unit with the date-time information included in latest traffic information among all the traffic information accumulated in the storage device, and wherein the traffic information distribution unit sets the entire information distribution mode regardless of the divergence degree if a time interval of the two pieces of date-time information which are compared is larger than or equal to a predetermined time interval.

5. The traffic information distribution apparatus of claim 4, wherein the traffic information distribution apparatus:

takes a statistics of real-time traffic information acquired at a predetermined time interval by a date and a time zone, and comprises a statistical traffic information accumulation unit for accumulating the statistics, and wherein the distribution mode setting unit varies the predetermined time interval which is a reference time interval to be compared with the time interval of the two pieces of the date-time information depending on a traffic volume-time change rate of a date and a time zone indicated by the two pieces of the date-time information that is accumulated in the statistical traffic information accumulation unit.

6. The traffic information distribution apparatus of claim 2, wherein the traffic information accumulated in the traffic information accumulation unit is any one of real-time traffic information on roads in a predetermined area which has been acquired by the traffic information distribution apparatus, traffic statistic information generated by statistically processing the real-time traffic information or predicted traffic information generated by processing the statistical traffic information.

7. The traffic information distribution apparatus of claim 2, wherein the traffic information distribution apparatus configures the identification information included in the traffic information to include at least one of type information of the traffic information, the date-time information of the traffic information, and attribution information of a date and time the traffic information pertains to.

8. A traffic information distribution apparatus which distributes predicted traffic information regarding a road traffic situation individually to each of in-vehicle terminals equipped with vehicles, comprising:

a predicted traffic information accumulation unit configured to accumulate at least a group of a plurality of pieces of the predicted traffic information each of which pertains to a different time that belongs to a same time-line;

a distribution request information reception unit configured to receive from the in-vehicle terminal distribution request information which requests the traffic information distribution apparatus to distribute the predicted traffic information;

a reference traffic information selection unit configured to select as reference traffic information one of the plurality of pieces of the predicted traffic information each of which pertains to a different time that belongs to the same time-line, when the received distribution request information contains a distribution request for requesting the plurality of pieces of the predicted traffic information each of which pertains to a different time that belongs to the same time-line;

a difference traffic information generation unit configured to generate difference traffic information between the reference traffic information and the predicted traffic information which is not selected as the reference traffic information;

a traffic information distribution unit configured to distribute entire information of the selected predicted traffic information and only the difference traffic information of non-selected predicted traffic information.

* * * * *